Figure 1:
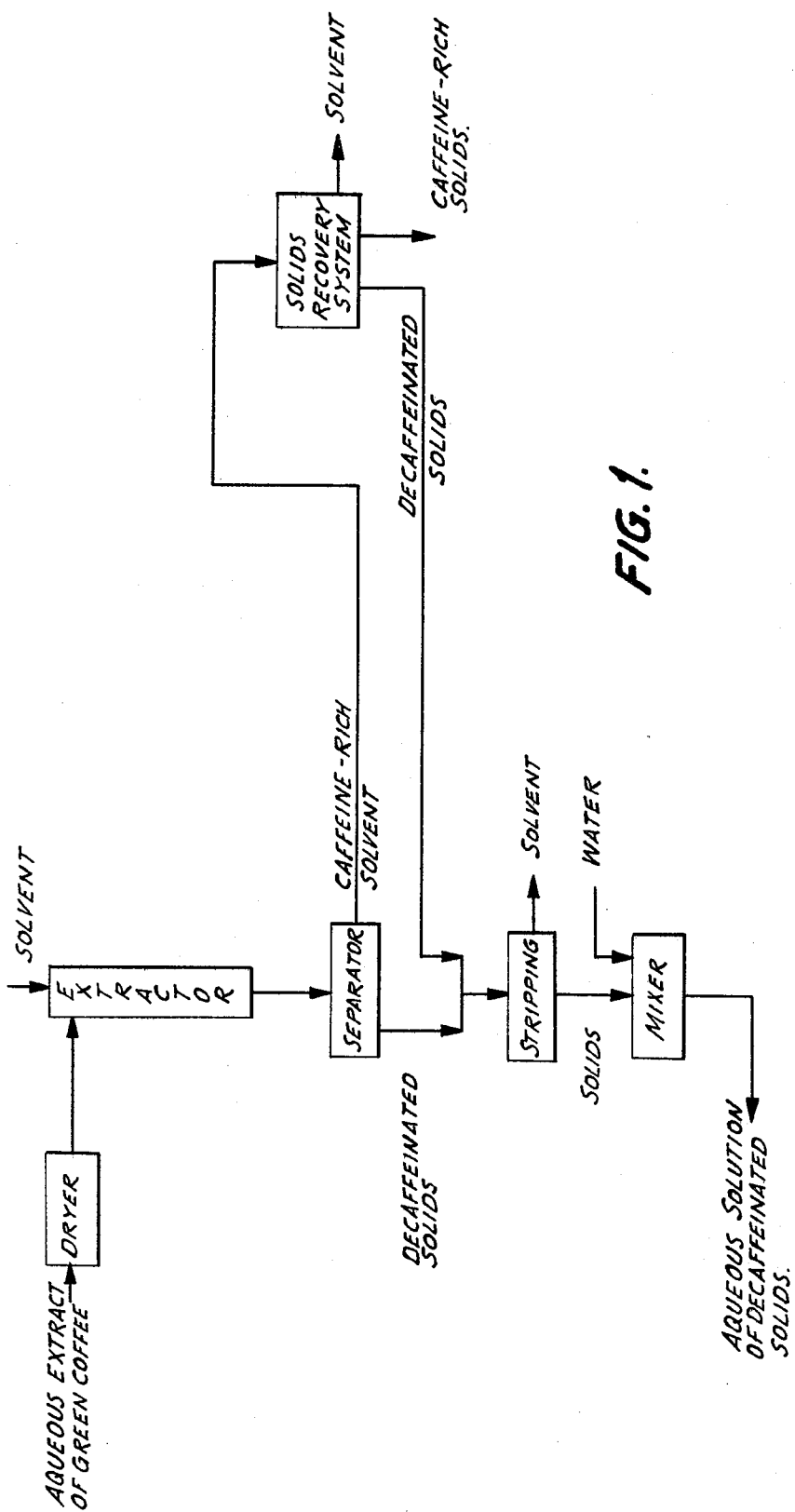

United States Patent [19]

Hudak et al.

[11] 4,081,563

[45] Mar. 28, 1978

[54] DECAFFEINATION OF GREEN COFFEE

[75] Inventors: Stephen F. Hudak, Ossining, N.Y.; James P. Mahlmann, Wayne, N.J.

[73] Assignee: General Foods Corporation, White Plains, N.Y.

[21] Appl. No.: 652,950

[22] Filed: Jan. 28, 1976

[51] Int. Cl.$^2$ ............................................. A23L 1/28
[52] U.S. Cl. .................................... 426/428; 260/256; 426/427
[58] Field of Search ................. 426/427, 428; 260/256

[56] References Cited

U.S. PATENT DOCUMENTS

| 1,123,827 | 1/1915 | Whitaker et al. | 426/428 |
|---|---|---|---|
| 1,629,512 | 5/1927 | Kündig | 426/428 |
| 2,309,092 | 1/1943 | Berry et al. | 426/428 X |
| 2,472,121 | 6/1949 | Ornfelt | 426/428 X |
| 3,361,571 | 1/1968 | Nutting et al. | 426/428 X |
| 3,740,230 | 6/1973 | Mahlmann | 426/428 |

FOREIGN PATENT DOCUMENTS

| 397,323 | 8/1933 | United Kingdom | 426/428 |
|---|---|---|---|
| 6,375 of | 1906 | United Kingdom | 426/428 |

OTHER PUBLICATIONS

Coffee Processing Technology, vol. 2, by M. Sivetz, pub. by Avi Pub. Co., Westport, Conn, 1963, pp. 212 and 213.
The Merck Index, Eighth edition, published by Merck & Co., Inc., Rahway, N. J. 1968, p. 188.

*Primary Examiner*—Frank W. Lutter
*Assistant Examiner*—Frank Sever
*Attorney, Agent, or Firm*—Thomas R. Savoie; Bruno P. Struzzi; Daniel J. Donovan

[57] ABSTRACT

A water extract of green coffee beans is dried and this dried powder is extracted with a solvent for caffeine such as ethanol. The decaffeinated solids are rehydrated and either reincorporated into the water-extracted green coffee which is then roasted and ground or used as a caffeine-deficient extraction medium for decaffeinating green coffee.

8 Claims, 2 Drawing Figures

DECAFFEINATION OF GREEN COFFEE

BACKGROUND OF THE INVENTION

Current commercial decaffeination of coffee is effected by the removal of caffeine from whole, green coffee beans. The beans are first moistened and then extracted with a solvent which is relatively specific for caffeine. The solvents employed commercially are either a halogenated hydrocarbon solvent, such as discussed in U.S. Pat. No. 3,671,263 to Patel et al. or a caffeine-deficient water solution of coffee solubles, such as disclosed in U.S. Pat. No. 2,309,092 to Berry et al., both of which are herein incorporated by reference.

In the decaffeination process of U.S. Pat. No. 2,309,092 which is commonly referred to as the water extraction system (Note: Sivetz, *Coffee Processing Technology*, Vol. 2, p. 208, AVI Publishing Co., Inc., 1963) the caffeine laden water extract, resulting from contact between caffeine-containing green coffee and the caffeine-deficient water solution, is solvent extracted with one of the same hydrocarbon caffeine solvents which are employed in the direct solvent extraction processes exemplified by the aforementioned 3,671,263 patent.

As a result of the presence of halogenated hydrocarbon solvents, in commerical green bean decaffeination processes, the decaffeinated coffee products presently being sold, either roasted and ground or soluble, contain at least trace amounts of halogenated compounds. This solvent residue can impart an off-flavor to coffee beverages and its presence within coffee products is becoming the subject of increasingly stringent governmental regulation.

Thus, the coffee industry is desirous of finding alternative systems for decaffeination which will avoid the use of halogenated solvents. Alcohols such as ethanol, have long been known as solvents for caffeine; however, their use in extracting caffeine from green coffee, which must of necessity be moistened with water, or from an aqueous extract of green coffee has not been considered practical because of their miscibility with water. The use of caffeine solvents which have boiling points above that of water, such as triacetin (B.P. 276° C.) and diethyl ketone (B.P. 102° C.) have also not previously been considered practical for commerical use.

DESCRIPTION OF THE INVENTION

The present invention is directed to a process for decaffeinating green coffee wherein green coffee, in either whole bean or subdivided form, is extracted with an aqueous decaffeinating liquid, which liquid is subsequently dried and extracted with a caffeine-specific, preferably non-halogenated solvent. The decaffeinated solids are then stripped of residual solvent and reconstituted with water. This liquid may then be absorbed by dry decaffeinated green coffee or used to decaffeinate green, caffeine-containing coffee. The solvent extract will desirably be freed of both caffeine and any non-caffeine solids extracted and recycled to the extraction system. It may further be desirable to process the extracted solids in a solids recovery system, such as shown in FIG. 1 and as is further described below, in order to obtain additional decaffeinated solids and a solids fraction which is high in caffeine.

The aqueous decaffeinating medium may be either pure water or a caffeine-deficient solution of green coffee solubles depending on whether a batch or continuous (or semi-continuous) system is desired. In a batch system, pure water contacts the green coffee and extracts caffeine as well as numerous other soluble solids. It will normally be desirable to add-back these non-caffeine soluble solids to the decaffeinated green coffee. As will be appreciated by those skilled in the art, this can readily be done by, as previously mentioned, reconstituting the dry, decaffeinated soluble solids in water and absorbing this liquid onto dried, decaffeinated green coffee which has previously been water extracted.

In a continuous system, including a counter-current, battery process such as disclosed in the previously-mentioned Berry et al. patent, a caffeine-deficient aqueous solution of green coffee solubles (caffeine-lean green extract) contacts the green coffee and extracts caffeine therefrom. This caffeine-containing aqueous solution (caffeine-rich green extract) is then dried and decaffeinated according to this invention in order to obtain dry, decaffeinated green coffee solids. The decaffeinated solids are then reconstituted in water to yield a caffeine-deficient aqueous solution of green coffee solubles which is recycled to contact caffeine-containing green coffee.

The aqueous, caffeine-containing liquid which results from the extraction of green coffee can be dried by any method known to the art. Typically spray-drying or freeze-drying will be used in order to produce a dry material which can be readily extracted with a caffeine solvent and subsequently reconstituted with water.

The caffeine solvent used to extract caffeine from the dried rich green extract can be any solvent which is reasonably selective for caffeine, that is a solvent which will extract caffeine from the dried rich green extract in preference to other compounds present. Preferably the solvent is non-halogenated and otherwise acceptable for use in food processing. Since, according to this invention, the solvent does not come in contact with water, it will be possible to employ as solvents fluids which are water-miscible and/or have a boiling point higher than water. Suitable solvents would be organic solvents such as methyl, ethyl and propyl alcohols, as well as triacetin, acetone, diethyl ketone, diisopropyl ether, ethyl ether and ethyl acetate.

The dried green extract is separated from the caffeine-containing solvent after a suitable degree of caffeine extraction has been effected. As will be recognized by those skilled in the art, the period of contact between the solvent and the green extract will be dependent upon such processing variables as the temperature and amount of the solvent as well as the type contacting (e.g. fixed bed, stirred tank, etc.) employed. It may be desirable to employ techniques such as grinding the dried extract while in contact with the solvent in order to increase contact between caffeine and the solvent. Residual solvent should be removed from the decaffeinated, dried green extract by such means as vacuum stripping.

The solvent-free dried green extract will be dissolved in water at a solids concentration of about 10 to 20% by weight. This caffeine-lean green extract is then, as previously mentioned, either absorbed onto dried water decaffeinated green coffee, typically at a weight ratio of about one to one, or contacted with caffeine-containing green coffee in order to extract caffeine therefrom. In either event, a decaffeinated green coffee material can be produced.

As taught by the Berry et al. patent, the decaffeinated green coffee should be washed of surface solids so that any such surface deposits are not caramelized during subsequent roasting. The wash water may, of course, be used as the aqueous liquid for reconstituting the decaffeinated, dried green extract.

The washed coffee, if not immediately roasted, should be dried and cooled for subsequent roasting. Conventional vacuum drying and conventional cooling methods are suitable for use in this invention.

Figure 2:
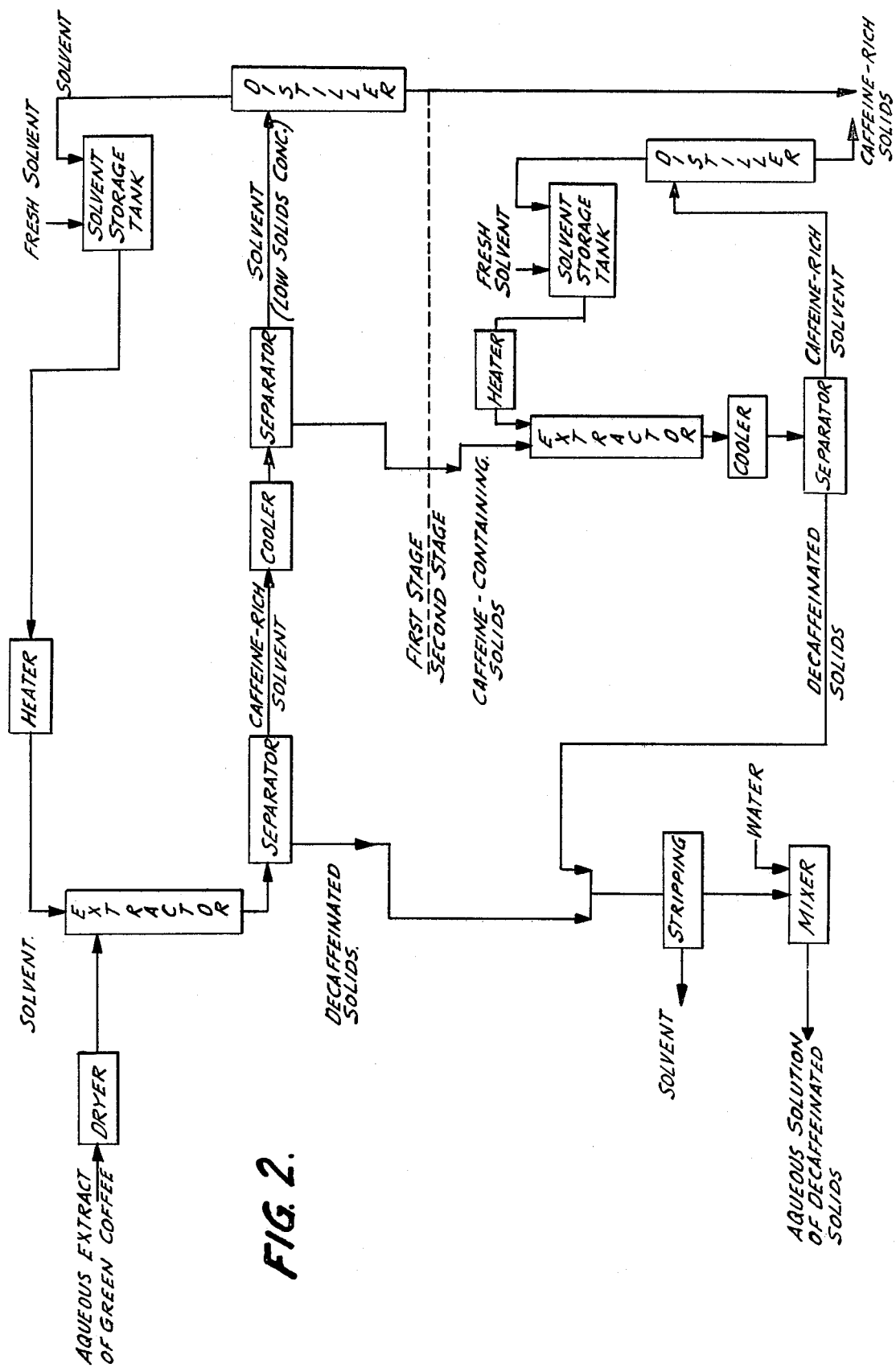

According to the preferred embodiment of this invention, as shown in FIG. 2, it is desirable to recover non-caffeine solids which might be extracted from the dried green extract, since in practice it has been found that solids in addition to caffeine are extracted by the caffeine solvent, especially when the solvent is used at elevated temperatures. It is possible to precipitate most of the solids contained in the solvent by cooling. When the solvent temperature is lowered, caffeine and non-caffeine solids will crystallize out of the solvent. These solids can be separated by a filter and further processed in a second-stage caffeine extraction process in order to isolate a caffeine-free solids fraction suitable for combination with the dried, decaffeinated green extract and a caffeine-rich solids fraction from which pure caffeine may be separated in accordance with known techniques.

The cooled and filtered solvent can be recycled to again extract dried, rich green extract. The solvent which will contain a relatively low concentration of caffeine-rich solids can be used directly, usually with the addition of fresh solvent, or it will be possible to recover solids-free solvent by such means as distillation and to combine the caffeine-rich solids residue with the caffeine-rich solids fraction obtained from the second-stage caffeine extraction process.

As shown in FIG. 2, the caffeine-containing solids may be further processed in a second-stage extraction system. These solids are again contacted and extracted with a heated solvent, usually the same chemical solvent used in the extraction of the dried green solids. The heated solvent removes essentially all the caffeine from the solids yielding, on cooling and separation, a caffeine-free solids fraction which may be combined with the decaffeinated solids from the first stage and a caffeine-rich solvent fraction. The caffeine-rich solvent fraction is preferably distilled, the solvent being recycled for further caffeine extraction. The caffeine-rich solids residue may be further processed either in a third-stage extraction system from which additional caffeine-free solids are obtained, or in a conventional caffeine-refining process.

Having thus described the invention what is claimed is:

1. A method for decaffeinating green coffee wherein an aqueous extraction fluid contacts and extracts caffeine from caffeine-containing green coffee resulting in an aqueous solution of green coffee solubles and wherein caffeine is removed from caffeine containing green coffee solubles by means of a liquid organic solvent for caffeine to form non-caffeine green coffee solubles, the improvement comprising drying the aqueous solution of green coffee solubles and extracting the dried solids with an organic water-miscible caffeine solvent.

2. The method of claim 1 wherein the caffeine solvent is selected from the group consisting of methyl, ethyl and propyl alcohols.

3. The method of claim 2 wherein the solvent is a propyl alcohol.

4. The method of claim 2 wherein the organic solvent is first separated from the decaffeinated dried solids and then is further processed to recover non-caffeine solids contained therein which non-caffeine solids are then combined with the dried solvent-extracted green coffee solubles.

5. The method of claim 4 wherein the organic solvent is further processed by cooling to precipitate coffee solids and the precipitated solids are extracted with a solvent for caffeine.

6. The method of claim 5 wherein both the solvent used to extract the dried solids and the solvent used to extract the precipitated solids is the same.

7. The method of claim 5 wherein the aqueous extraction fluid is water and the decaffeinated dried solids are reconstituted with water and absorbed on water extracted green coffee.

8. The method of claim 5 wherein the aqueous extraction fluid is a caffeine-deficient solution of green coffee solubles and the decaffeinated dried solids are reconstituted with water and the resulting solution is employed to extract caffeine from caffeine-containing green coffee.

* * * * *